United States Patent [19]

Lausberg et al.

[11] Patent Number: 4,921,889

[45] Date of Patent: May 1, 1990

[54] THERMOPLASTIC MOLDING MATERIALS BASED ON NYLONS AND POLYARYL ETHER KETONES

[75] Inventors: Dietrich Lausberg; Erhard Seiler, both of Ludwigshafen, Fed. Rep. of Germany

[73] Assignee: BASF Aktiengesellschaft, Ludwigshafen, Fed. Rep. of Germany

[21] Appl. No.: 127,238

[22] Filed: Dec. 1, 1987

[30] Foreign Application Priority Data

Dec. 4, 1986 [DE] Fed. Rep. of Germany ....... 3641497

[51] Int. Cl.$^5$ .................... C08L 23/00; C08L 61/18; C08L 63/00; C08L 77/02

[52] U.S. Cl. .................... 523/400; 523/444; 523/445; 523/468; 524/404; 524/452; 524/514; 524/538; 524/541; 524/542; 525/66; 525/153; 525/178; 525/420; 525/426; 525/425; 525/429; 525/432; 525/434; 525/471

[58] Field of Search ............... 525/153, 420, 471, 419, 525/425, 426, 434, 435, 437, 438, 429, 432; 523/400, 444, 445, 468; 524/404, 424, 425, 436, 437, 447, 449, 452, 456, 502, 504, 513, 514, 538, 539, 541

[56] References Cited

U.S. PATENT DOCUMENTS

3,324,199 6/1967 Tocker ................................ 525/437
4,340,697 7/1982 Aya et al. ........................... 525/420

FOREIGN PATENT DOCUMENTS

0059077 9/1982 European Pat. Off. .
0166450 1/1986 European Pat. Off. .
1446962 8/1976 United Kingdom .

OTHER PUBLICATIONS

Patent Abstracts of Japan, vol. 9, No. 45, (C-268) [1768], Feb. 26, 1985 & JP-A-59 187 054.
Patent Abstracts of Japan, vol. 9, No. 41, (C-267) [1764], Feb. 21, 1985; & JP-A-59 184 254.

*Primary Examiner*—Allan M. Lieberman
*Attorney, Agent, or Firm*—Oblon, Spivak, McClelland, Maier & Neustadt

[57] ABSTRACT

Thermoplastic molding materials contain, as essential components,
(A) from 2 to 97.9% by weight of a nylon,
(B) from 2 to 97.9% by weight of a polyaryl ether ketone and
(C) from 0.1 to 30% by weight of a polymeric component containing hydroxyl groups and in addition
(D) from 0 to 50% by weight of an impact-modifying rubber and
(E) from 0 to 60% by weight of fibrous and/or particulate fillers.

10 Claims, No Drawings

THERMOPLASTIC MOLDING MATERIALS BASED ON NYLONS AND POLYARYL ETHER KETONES

The present invention relates to thermoplastic molding materials containing, as essential components, (A) from 2 to 97.9% by weight of a nylon,
(B) from 2 to 97.9% by weight of a polyaryl ether ketone and
(C) from 0.1 to 30% by weight of a polymeric component containing hydroxyl groups and in addition
(D) from 0 to 50% by weight of an impact-modifying rubber and
(E) from 0 to 60% by weight of fibrous and/or particulate fillers.

The present invention furthermore relates to the use of such molding materials for the production of moldings, and to the moldings obtainable from the molding materials.

Polyaryl ether ketones are partially cystalline polymers having excellent properties, in particular stress cracking resistance, high temperature stability, abrasion resistance and toughness. One problem, however, is that processing has to be carried out at about 400° C.

Nylons have good mechanical properties, but the overall properties do not reach the level achieved by polyaryl ether ketones. However, nylons are substantially simpler to process than polyaryl ether ketones.

It is an object of the present invention to provide thermoplastic molding materials which consist of nylons and polyaryl ether ketones, possess good mechanical properties, in particular impact strength, flexural strength, tensile strength and modulus of elasticity and moreover have good resistance to solvents and little susceptibility to stress corrosion cracking. Furthermore, the molding materials should be easier to process than polyaryl ether ketones.

We have found that this object is achieved, according to the invention, by the thermoplastic molding materials defined at the outset.

Preferred materials of this type are described in the subclaims.

The novel thermoplastic molding materials contain, as component A, a nylon or a blend of several nylons. In principle, partially crystalline and amorphous nylons are suitable, but partially crystalline nylons are preferred since the molding materials prepared from them generally have better heat distortion resistance and stress cracking resistance than molding materials obtained from amorphous nylons. Nylons which can be used according to the invention are known per se and include, for example, nylons having molecular weights of 5,000 or higher, as described, for example, in U.S. Pat. Nos. 2,071,250, 2,071,251, 2,130,523, 2,130,948, 2,241,322, 2,312,966, 2,512,906 and 3,393,210.

The nylons can be prepared, for example, by condensation of equimolar amounts of a saturated dicarboxylic acid of 4 to 12 carbon atoms with a diamine of 4 to 14 carbon atoms, or by condensation of $\Omega$-aminocarboxylic acids or by polyaddition of lactams. Examples of nylons are polyhexamethyleneadipamide (nylon 66), polyhexamethyleneazelaamide (nylon 69), polyhexamethylenesebacamide (nylon 610), polyhexamethylenedodecanediamide (nylon 612), the nylons obtained by subjecting lactams to ring cleavage, e.g. polycaprolactam and polylauryllactam, and poly-11-aminoundecanoic acid and di-(p-aminocyclohexyl)methanedodecanediamide. It is also possible, according to the invention, to use nylons which have been prepared by copolycondensation of two or more of the above-mentioned polymers or their components, for example a copolymer of adipic acid, isophthalic acid and hexamethylenediamine. The nylons are preferably linear and have melting points higher than 200° C.

Preferred nylons are polyhexamethyleneadipamide, polyhexamethylenesebacamide and polycaprolactam. The nylons generally have a relative viscosity of from 2.0 to 5, determined on a 1% strength by weight solution in $H_2SO_4$ at 23° C., which corresponds to a weight average molecular weight of about 15,000–45,000. Of course, blends of nylons can also be used.

The amount of nylon A in the novel molding materials is up to 97.9% by weight, based on the total weight. Molding materials containing from 10 to 78, in particular from 20 to 67, % by weight of nylon are particularly preferred.

The novel molding materials contain, as component B, a polyaryl ether ketone or a blend of several polyaryl ether ketones. Here, polyaryl ether ketones are homopolycondensates and copolycondensates which contain, in the main chain, carbonyl groups bonded to aromatic radicals, and whose repeating units are bonded via ether bridges.

Preferred polyaryl ether ketones are those having repeating units of the general formulae I to V

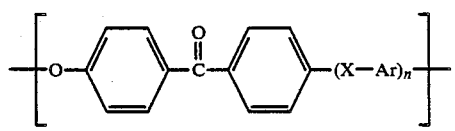

(I)

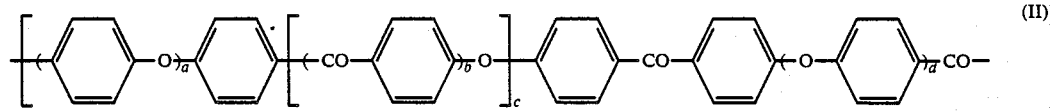

(II)

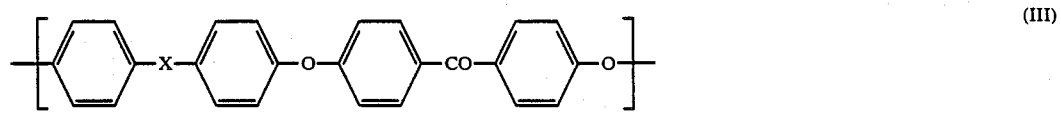

(III)

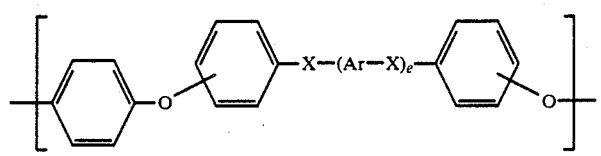
(IV)
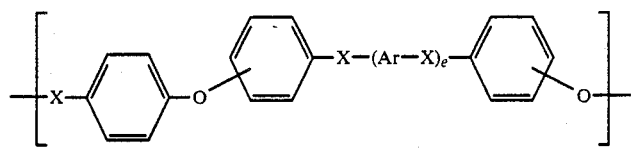
(V)
where Ar is phenylene, diphenylene or naphthylene, X is O, —CO— or a direct chemical bond, a is an integer of from 1 to 4 and b, c, d and e may each be 0 or 1.
All aromatic units in the general formulae I to V may be substituted by $C_1$–$C_8$-alkyl, $C_1$–$C_8$-alkoxy, Cl or F.
Particularly preferred polyaryl ether ketones of the formulae I to V are those having the following repeating units:
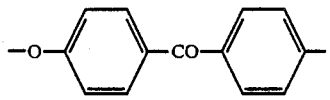
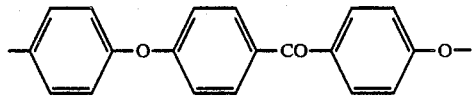
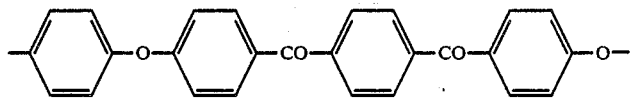
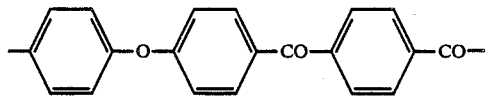
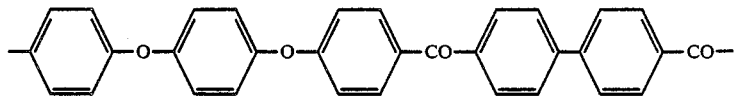
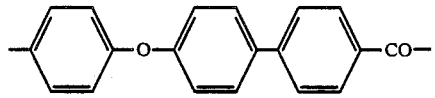
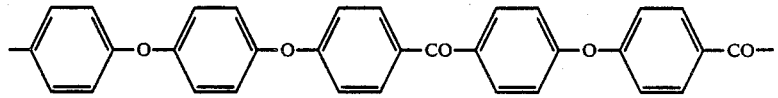
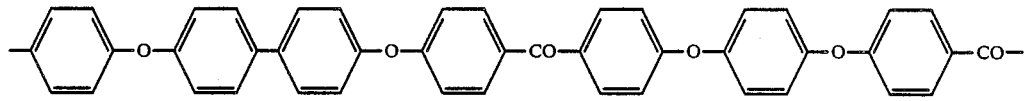
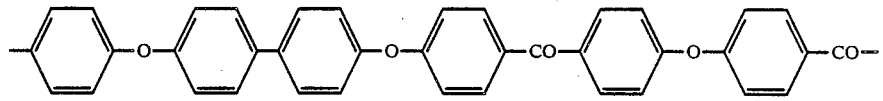
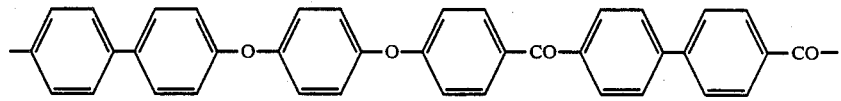

-continued

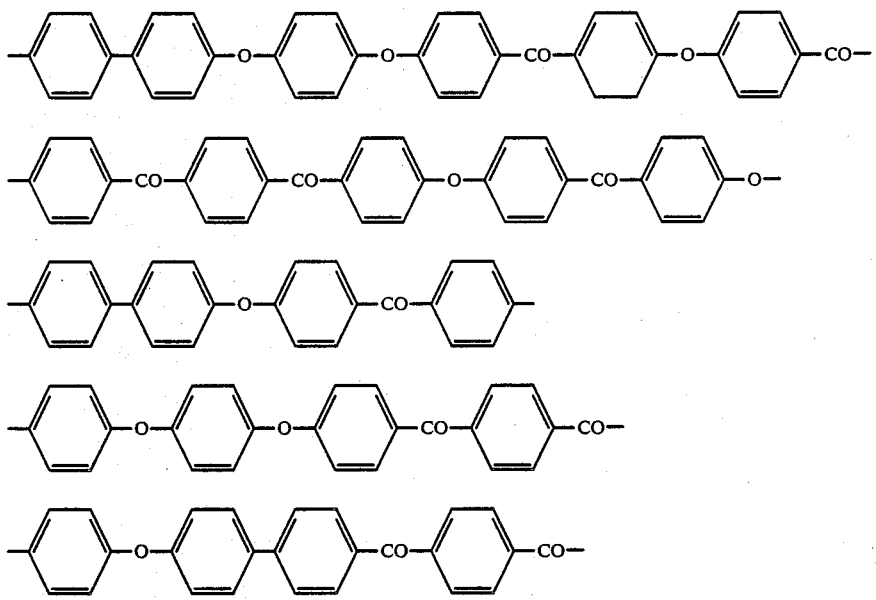

In addition to the ether ketone building blocks, the polyaryl ether ketones used in the novel molding materials may furthermore contain aryl ether structures, as are known, for example, from polyaryl ether sulfones. The following are examples of these:

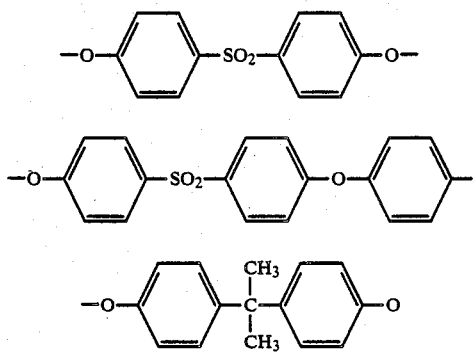

Further units are described in, for example, German Laid-Open Application No. DOS 3,014,230. The amount of such units is in general up to 50, in particular up to 40, mol %, based on the total number of repeating units in the polyaryl ether ketones.

The preparation of such polyaryl ether ketones is known per se and is described in the literature, for example in German Published Application No. DAS 1,545,106, German Laid-Open Applications Nos. DOS 1,957,091 and DOS 2,731,816, Canadian Patent No. 847,963 and German Laid-Open Application No. DOS 3,014,230 mentioned above, so that further information is superfluous here. It should merely be stated that in principle the nucleophilic polycondensation of dihydroxy compounds with dihalogen compounds as well as electrophilic preparation processes (Friedel-Crafts acylation) are suitable.

Aromatic polyaryl ether ketones of this type generally have weight average molecular weights of from 10,000 to 100,000, preferably from 15,000 to 50,000, and limiting viscosities (measured at 25° C. in 1% strength by weight solution in 96% by weight $H_2SO_4$) of from 0.4 to 1.6, preferably from 0.8 to 1.4.

The content of component B in the novel molding materials, like that of component A, is from 2 to 97.9, preferably from 20 to 88, in particular from 30 to 75, % by weight, based on the total weight of components A to E.

The novel molding materials contain, as essential component C, a polymeric component containing hydroxyl groups. The experiments carried out showed that in principle any group having proton-donating properties should be suitable, but that groups having the structural unit —OH are particularly useful. The compatibility-improving action of component C is probably due to the fact that interactions, for example H bridge bonds, occur between component C and components A and B and result in better adhesion between the phases.

As stated above, all polymers having essentially freely available hydroxyl groups are in principle suitable. Of course, it should be ensured that components A and B are stable to component C. This is particularly important where compounds having acidic OH groups are used.

When these preconditions are taken into account, some groups of compounds have proven particularly advantageous, and these are described below. However, it is possible in principle to use other components C too, provided that the stability of components A and B does not suffer.

The first group of particularly suitable polymers comprises polycondensates of aliphatic or aromatic diols or polyhydric alcohols with epihalohydrins. Such compounds and processes for their preparation are familiar to the skilled worker and therefore need not be described in detail here. In principle, aliphatic or aromatic diols are suitable. Particularly preferred dihydroxy compounds are the diols used for the preparation of polycarbonates.

Because it is readily obtainable, a polycondensate of bisphenol A and epichlorohydrin having the structure

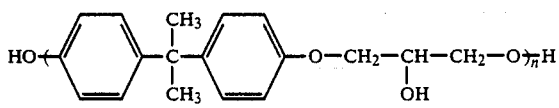

is preferably used.

In addition to the possibility of using polymers which already have the hydroxyl group in the main chain it is also possible to employ polymers or copolymers into which these functional groups are introduced by the concomitant use of suitable monomers during the polymerization, in which case the groups may likewise be present in the polymers in the main chain or in substituents of the main chain. Another possibility involves grafting suitable monomers having OH groups onto grafting bases; in principle, suitable grafting bases are all polymers which are not completely incompatible with components A and B. A certain degree of incompatibility can be compensated by increasing the content of hydroxyl groups.

Examples of suitable components C are therefore polymers based on polyolefins, polystyrene and rubber elastomers, which possess hydroxyl groups —OH and are obtainable either by using suitable comonomers or by grafting on the functional groups —OH. The proportion of comonomers or graft monomers containing hydroxyl groups —OH is dependent on the extent of compatibility of the base polymer with components (A) and (B). The better the compatibility, the lower may be the content of OH groups. From the above it is evident that a large number of polymers are suitable as component C, of which a few particularly preferred types are described in detail below, merely by way of example.

The first group comprises polymers and copolymers containing up to 100 mol % of vinylphenylcarbinols, vinylphenyldimethylcarbinols and in particular vinylphenylhexafluorodimethylcarbinol having proven particularly suitable. Advantageous base polymers or grafting bases are once again the abovementioned types of polymers.

The second group comprises polymers of vinylphenols and copolymers of the abovementioned base polymers with vinylphenols, which may furthermore contain substituents in the nucleus. Substituents which increase the acidity of the phenolic hydrogen are particularly suitable, for example halogen substituents, as well as other electron-attracting substituents.

A third group comprises the phenol/formaldehyde polycondensates, provided that they are noncrosslinked and soluble. These products may be straight-chain or branched.

Other examples are all polymers and copolymers with any polymerizable or graftable alcohols.

It should be mentioned that polymers having hydroxyl groups and based on nylons or polyaryl ether ketones are particularly preferred since in this case there is compatibility with at least component A or B from the outset, so that the content of OH groups can be reduced.

Component C can be prepared by a conventional process for polycondensation or graft polymerization or copolymerization, and further information is therefore unnecessary here.

The content of component C in the novel molding materials is from 0.1 to 30% by weight, based on the total weight of components A to E, and depends on the compatibility of the base polymer with components A and B. In general, contents of from 1 to 25, in particular from 3 to 20, % by weight have proven particularly advantageous.

In addition to components A to C, the novel molding materials can contain impact-modifying rubbers as component D for improving the impact strength. Elastomers (rubbers) which improve impact strength and are suitable for nylons are familiar to the skilled worker. Impact-modifying rubbers which can be used are in principle those which withstand the required processing temperatures substantially without decomposition.

A few preferred types of such elastomers are described below.

The first preferred group comprises the ethylene/-propylene (EPM) and ethylene/propylene/diene (EPDM) rubbers, which preferably have a ratio of ethylene radicals to propylene radicals of from 20:80 to 80:20.

The Mooney viscosities (MLI + 4/100° C.) of such noncrosslinked EPM and EPDM rubbers (gel contents generally less than 1% by weight) are preferably from 25 to 100, in particular from 35 to 90 (measured using a large rotor after a running time of 4 minutes at 100° C. according to DIN 53,523).

In general, EPM rubbers contain virtually no double bonds, whereas EPDM rubbers may have from 1 to 20 double bonds per 100 carbon atoms.

Examples of diene monomers for EPDM rubbers are conjugated dienes, such as isoprene and butadiene, non-conjugated dienes of 5 to 25 carbon atoms, such as buta-1,4-diene, hexa-1,4-diene, hexa-1,5-diene, 2,5-dimethyl-hexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methylallyl-5-norbornene and 2-isopropenyl-5-norbornene, and tricyclodienes, such as 3-methyltricyclo(5.2.1.0.2.6)-deca-3,8-diene, as well as mixtures of these. Hexa-1,5-diene, 5-ethylidenenorbornene and dicyclopentadiene are preferred. The diene content of the EPDM rubbers is preferably from 0.5 to 10, in particular from 1 to 8, % by weight, based on the total weight of the rubber.

EPM and EPDM rubbers may also be grafted with reactive carboxylic acids or their derivatives. Acrylic acid, methacrylic acid and their derivatives and maleic anhydride may be mentioned here merely as typical examples.

Another group of preferred rubbers comprises copolymers of ethylene with acrylates and/or methacrylates, in particular those which additionally contain epoxy groups or free acid groups. These epoxy groups are preferably incorporated into the rubber by adding to the monomer mixture monomers which contain epoxy groups and are of the general formula II or III

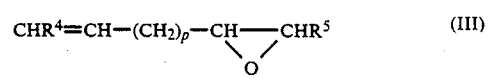

where $R^1$, $R^2$, $R^3$, $R^4$ and $R^5$ are each hydrogen or alkyl of 1 to 6 carbon atoms, m is an integer from 0 to 20, n is an integer from 0 to 10 and p is an integer from 0 to 5.

$R^1$, $R^2$ and $R^3$ are each preferably hydrogen, m is preferably 0 or 1 and n is preferably 1. The corresponding compounds are alkyl glycidyl ethers or vinyl glycidyl ethers.

Preferred examples of compounds of the formula II are acrylates and/or methacrylates containing epoxy groups, of which glycidyl acrylate and glycidyl methacrylate are particularly preferred.

The ethylene content of the copolymers is in general from 50 to 98% by weight, and the content of monomers containing epoxy groups and that of the acrylate and/or methacrylate are each from 1 to 49% by weight.

Particularly preferred copolymers are those consisting of
from 50 to 98, in particular from 60 to 95, % by weight of ethylene,
from 1 to 40, in particular from 2 to 20, % by weight of glycidyl acrylate and/or glycidyl methacrylate and
from 1 to 45, in particular from 10 to 35, % by weight of n-butyl acrylate and/or 2-ethylhexyl acrylate.

Other preferred esters of acrylic acid and/or methacrylic acid are the methyl, ethyl, propyl, isobutyl and tert-butyl esters.

Instead of the esters, acrylic acid and/or methacrylic acid themselves may be used.

It is also possible to employ vinyl esters and vinyl ethers as comonomers.

Finally, other preferred comonomers are maleic anhydride and its derivatives.

The ethylene copolymers described above can be prepared by a conventional process, preferably by random copolymerization under high pressure and at elevated temperatures. Appropriate processes are described in the literature.

The melt flow index of the ethylene copolymers is in general from 1 to 80 g/10 min (measured at 190° C. and under a load of 2.16 kg).

The rubbers D used may furthermore be graft polymers consisting of
from 25 to 98% by weight of an acrylate rubber having a glass transition temperature of less than −20° C., as a grafting base, and
from 2 to 75% by weight of a copolymerizable ethylenically unsaturated monomer whose homopolymers and copolymers have a glass transition temperature higher than 25° C., as the graft.

The grafting bases are acrylate and methacrylate rubbers, and up to 40% by weight of other comonomers may be present. The $C_1$–$C_8$-esters of acrylic acid and methacrylic acid and their halogenated derivatives, as well as aromatic acrylates and mixtures of these, are preferred. Examples of comonomers in the grafting base are acrylonitrile, methacrylonitrile, styrene, α-methylstyrene, acrylamides, methacrylamides and vinyl $C_1$–$C_6$-alkyl ethers.

The grafting base may be noncrosslinked or partially or completely crosslinked. Crosslinking is effected by copolymerization of, preferably, from 0.02 to 5, in particular from 0.05 to 2, % by weight of a crosslinking monomer containing more than one double bond. Suitable crosslinking monomers are described in, for example, DE-A-27 26 256, DE-A-24 44 584 and EP-A-50 265.

Preferred crosslinking monomers are triallyl cyanurate, triallyl isocyanurate, triacryloylhexahydro-s-triazine and trialkylbenzenes.

If the crosslinking monomers contain more than 2 polymerizable double bonds, it is advantageous to limit their amount to not more than 1% by weight, based on the grafting base.

Particularly preferred grafting bases are emulsion polymers having a gel content of more than 60% by weight (determined in dimethylformamide at 25° C. according to M. Hoffmann, H. Krömer and R. Kuhn, Polymeranalytik, Georg-Thieme-Verlag, Stuttgart, 1977).

Particularly suitable graft monomers are styrene, α-methylstyrene, acrylonitrile, methacrylonitrile and methyl methacrylate and mixtures of these, in particular those consisting of styrene and acrylonitrile in a weight ratio of from 90:10 to 50:50.

The grafting yield, i.e. the quotient of the amount of grafted monomer and the amount of graft monomer used, is in general from 20 to 80%.

Rubbers based on acrylates, which can be used according to the invention, are described in, for example, DE-A-24 44 584 and DE-A-27 26 256.

The rubbers D preferably have a glass transition temperature of less than −30° C., in particular less than −40° C., resulting in a good impact strength even at low temperatures.

Of course, it is also possible to use blends of the abovementioned types of rubbers.

Examples of reinforcing fillers are asbestos, carbon fibers and, preferably, glass fibers, the glass fibres being used, for example, in the form of woven glass fabrics, glass mats, surface mats and/or, preferably, glass rovings or chopped glass strands of low-alkali E glasses having a diameter of from 5 to 200 μm, preferably from 8 to 15 μm, which, after they have been incorporated, have a mean length of from 0.05 to 1 mm, preferably from 0.1 to 0.5 mm.

Examples of other suitable fillers are wollastonite, calcium carbonate, glass spheres, powdered quartz, silicon nitride and boron nitride, amorphous silica, calcium metasilicate, magnesium carbonate, kaolin, mica and feldspar as well as mixtures of these fillers.

Of the abovementioned reinforcing fillers, glass fibers have proven particularly advantageous, particularly when very high heat distortion resistance is required.

The content of component E is from 0 to 60, preferably from 2 to 50, in particular from 5 to 30, % by weight, based on the total weight of the molding materials.

In addition to components A to E, the novel molding materials may contain conventional additives and processing assistants. The amount of these is in general up to 60, preferably up to 50, % by weight based on the total weight of components A to E.

Examples of conventional additives are stabilizers and antioxidants, heat stabilizers and UV stabilizers, lubricants and mold release agents, colorants, such as dyes and pigments, nucleating agents and plasticizers.

Antioxidants and heat stabilizers which may be added to the thermoplastic materials according to the invention are, for example, halides of metals of group I of the Periodic Table, for example sodium halides, potassium halides and lithium halides, if necessary in combination with copper(I) halides, for example chlorides, bromides or iodides. Sterically hindered phenols, hydroquinones, substituted members of this group and mixtures of these are also suitable, preferably in concentrations of up to 1% by weight, based on the weight of the mixture.

Examples of UV stabilizers are various substituted resorcinols, salicylates, benzotriazoles and benzophenones, which are generally used in amounts of up to 2.0% by weight.

Lubricants and mold release agents, which as a rule are added to the thermoplastic material in amounts of up to 1% by weight, are stearic acids, stearyl alcohol, stearates and stearamides, as well as the fatty acid esters of pentaerythritol.

Organic dyes, such as nigrosine, pigments, e.g. titanium dioxide, cadmium sulfide, cadmium sulfide selenide, phthalocyanines, ultramarine blue or carbon black, may also be added. Nucleating agents, such as talc, calcium fluoride, sodium phenylphosphinate, alumina or finely divided polytetrafluoroethylene, may be used in amounts of, for example, up to 5% by weight, based on components A to E.

The novel molding materials can be prepared by a conventional mixing process, for example by incorporating the polyaryl ether ketones into the nylon at above the melting point of the polyaryl ether ketone, in particular at from 320° to 400° C., particularly preferably from 330° to 380° C., in a conventional mixing apparatus, such as an extruder, kneader or mixer. The components D and E which may be present, are added accordingly.

The novel molding materials can readily be converted to moldings having a good surface quality and improved impact strength coupled with high rigidity, in particular at low temperatures. Separation of the polymer components occurs neither in the moldings nor in the melt.

EXAMPLES

The starting materials below were used for the preparation of novel thermoplastic molding materials.

Component A (nylons):

A1: Polyhexamethyleneadipamide having a relative viscosity of 3.31, measured on a 1% strength solution in 96% strength $H_2SO_4$ at 25° C.

A2: Polycaprolactam having a relative viscosity of 4.0 (measured as for A1).

A3: Polyhexamethylenesebacamide having a relative viscosity of 3.23 (measured as for A1).

A4: Nylon prepared from hexamethylenediamine and a mixture of isophthalic acid and terephthalic acid (weight ratio 60:40) and having a relative viscosity of 1.91, measured on a 1% strength by weight solution in concentrated sulfuric acid at 25° C.

Component B

B1: Polyaryl ether ketone containing repeating units

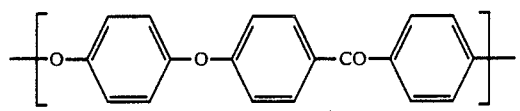

and having a limiting viscosity [η] of 1.2 dl/g, measured in 1% strength by weight solution in 96% strength by weight sulfuric acid at 25° C.

B2: Polyaryl ether ketone containing repeating units

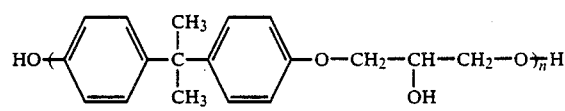

and having a limiting viscosity [η] of 0.9 dl/g (measured as for B1).

Component C:

C: Polycondensate of 2,2-di-(4-hydroxyphenyl)-propane and epichlorohydrin (Phenoxy ™, Union Carbide) having a relative viscosity of 1.13, measured in 0.5% strength by weight solution in dichloromethane at 25° C. Structure:

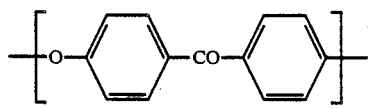

Component D:

The following rubbers were used for improving the impact strength:

D1: Graft rubber having a grafting base (75% by weight) of poly-n-butyl acrylate which has been reacted with butanediol diacrylate and a graft shell (25% by weight) consisting of a copolymer of styrene and acrylonitrile (weight ratio 75:25) prepared by emulsion polymerization in a conventional manner (median particle size $d_{50}$ = 250 nm).

D2: Terpolymer of ethylene, n-butyl acrylate and acrylic acid (weight ratio 65:30:5), prepared by high pressure polymerization in a conventional manner (MFI (melt flow index) = 10 g/10 min, determined at 190° C. and under 2.16 kg).

The median particle diameter $d_{50}$ is the diameter above and below which lie the diameters of 50% by weight of the particles.

The molding materials were prepared by a method in which the components were thoroughly mixed and the mixture was melted in a twin-screw extruder at 350° C., homogenized and extruded into a water bath. After granulation and drying, the mixture was molded in an injection molding machine to give test specimens, and the latter were investigated without further aftertreatment.

The tensile strength was determined using tensile test bars, according to DIN 53,455, and the heat distortion resistance was measured on flat bars according to ASTM ISO 75, method A.

The hole impact strength was determined according to DIN 53,753.

The results are shown in Tables 1 and 2, together with the composition of the individual molding materials (all percentages are by weight). Table 2 shows that, as a result of modification with the rubber, the toughness of the molding materials, particularly at low temperatures, can be considerably further increased.

TABLE 1

| | (all amounts in % by weight) | | | | | |
|---|---|---|---|---|---|---|
| Example no. | Component A | Component B | Component C | Tensile strength [N/mm$^2$] | Hole impact strength kJ/m$^2$ | |
| | | | | | +23° C. | −40° C. |
| 1V[1] | 50 A$_1$ | 50 B$_1$ | — | 92 | 5 | 3 |

TABLE 1-continued

| | (all amounts in % by weight) | | | | | |
|---|---|---|---|---|---|---|
| Example no. | Component A | Component B | Component C | Tensile strength [N/mm²] | Hole impact strength kJ/m² | |
| | | | | | +23° C. | −40° C. |
| 2V | 50 A₁ | 50 B₂ | — | 91 | 6 | 3 |
| 3V | 50 A₂ | 50 B₂ | — | 88 | 7 | 3 |
| 4V | 50 A₃ | 50 B₂ | — | 85 | 10 | 3 |
| 5V | 50 A₄ | 50 B₂ | — | 94 | 4 | 3 |
| 6 | 45 A₁ | 45 B₁ | 10 | 91 | 55 | 43 |
| 7 | 45 A₁ | 45 B₂ | 10 | 91 | 61 | 45 |
| 8 | 45 A₂ | 45 B₂ | 10 | 89 | 78 | 58 |
| 9 | 45 A₃ | 45 B₂ | 10 | 87 | 102 | 63 |
| 10 | 45 A₄ | 45 B₂ | 10 | 98 | 52 | 26 |

¹Comparative Example

TABLE 2

| | (all amounts in % by weight) | | | | | |
|---|---|---|---|---|---|---|
| Example no. | Component A | Component B | Component C | Component D | Hole impact strength kJ/m² | |
| | | | | | 23° C. | −40° C. |
| 11 | 45 A₂ | 45 B₁ | 5 | 5 D₂ | 92 | 66 |
| 12 | 45 A₂ | 45 B₂ | 5 | 5 D₂ | 95 | 78 |
| 13 | 45 A₁ | 45 B₂ | 5 | 5 D₁ | 92 | 69 |
| 14 | 45 A₃ | 45 B₂ | 5 | 5 D₂ | 106 | 89 |
| 15 | 42 A₂ | 42 B₂ | 6 | 10 D₁ | 104 | 92 |
| 16 | 42 A₄ | 42 B₂ | 6 | 10 D₁ | 84 | 61 |

We claim:
1. A thermoplastic molding material containing, as essential components,
   (A) from 2 to 97.9% by weight of a nylon,
   (B) from 2 to 97.9% by weight of a polyaryl ether ketone and
   (C) from 0.1 to 30% by weight of a polymeric component containing essentially free available hydroxyl groups with the proviso that components A and B are stable to component C, said polymeric component being selected from the group consisting of:
   (1) a polycondensate of aliphatic or aromatic diols with eihalohydrins,
   (2) a polymer selected from the group consisting of polyolefins, polystyrene or rubber elastomers or mixtures thereof having hydroxyl groups,
   (3) a polymer or copolymer or mixtures thereof containing up to 100 mol% of vinylphenylcarbinols or vinylphenyldimethylcarbinols or mixtures thereof, and
   (4) a non-crosslinked and soluble phenol/formaldehyde polycondensate, and in addition
   (D) from 0 to 50% by weight of an impact-modifying rubber and
   (E) from 0 to 60% by weight of fibrous or particulate fillers or mixtures thereof.
2. A thermoplastic molding material as claimed in claim 1, wherein the content of

(E) fibrous or particulate fillers or mixtures thereof is from 2 to 50% by weight.
3. A thermoplastic molding material as claimed in claim 1, wherein component C is a polycondensate of aliphatic or aromatic diols with epihalohydrins.
4. A thermoplastic molding material as claimed in claim 3, wherein said aromatic diol is bisphenol A and said epihalohydrin is epichlorohydrin.
5. A thermoplastic molding material as claimed in claim 1, wherein component C is a polymer selected from the group consisting of polyolefins, polystyrene or rubber elastomers or mixtures thereof having hydroxyl groups.
6. A thermoplastic molding material as claimed in claim 1, wherein component C is a polymer or copolymer or mixtures thereof containing up to 100 mol% of vinylphenylcarbinols or vinylphenyldimethylcarbinols or mixtures thereof.
7. A thermoplastic molding material as claimed in claim 1, wherein component C is a non-crosslinked and soluble phenol/formaldehyde polycondensate.
8. A thermoplastic molding material as claimed in claim 1, wherein the nylon (A) is poly ε caprolactam, polyhexamethyleneadipamide or mixtures thereof.
9. A thermoplastic molding material as claimed in claim 1, wherein the polyarylether ketone (B) has at least one of the following repeating units.

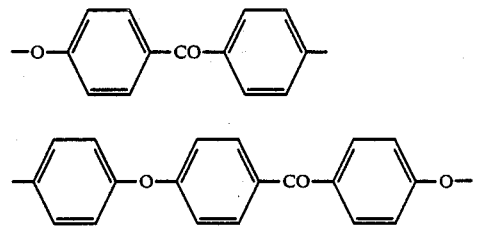

-continued
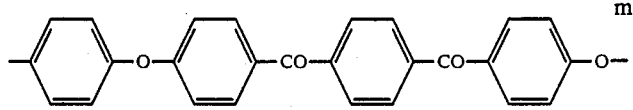
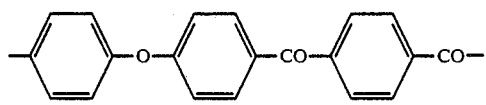
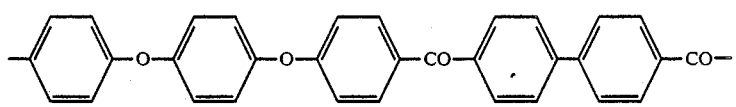
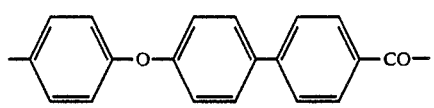
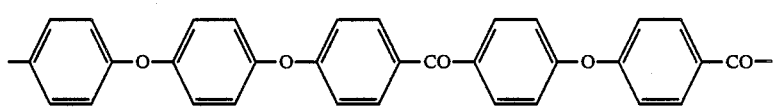
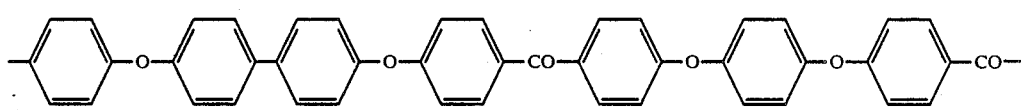
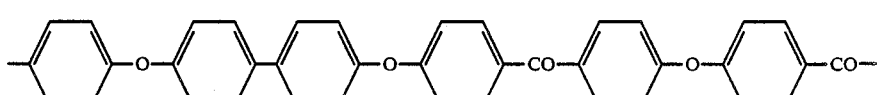
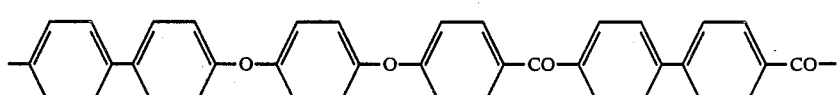
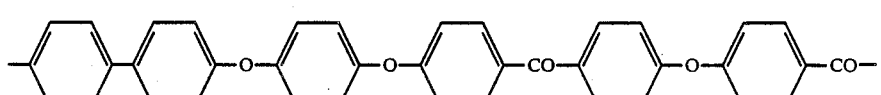
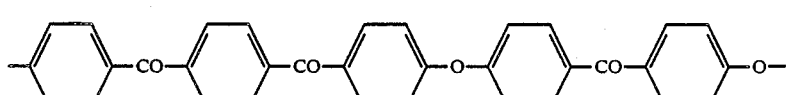
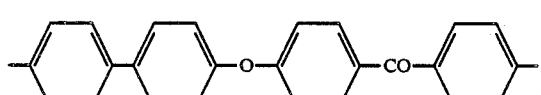
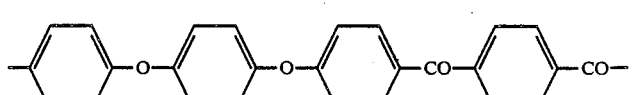
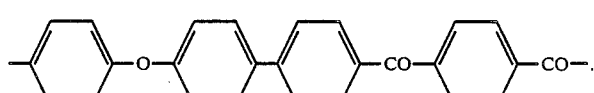
10. A molded article obtained from a thermoplastic molding material of claim 1.
* * * * *